(12) United States Patent
Tofte et al.

(10) Patent No.: US 12,241,471 B2
(45) Date of Patent: *Mar. 4, 2025

(54) DETECTING AND UTILIZING A RISE RATE FOR SUMP PUMP SYSTEM CONTROL

(71) Applicant: STATE FARM MUTUAL AUTOMOBILE INSURANCE COMPANY, Bloomington, IL (US)

(72) Inventors: Nathan L. Tofte, Downs, IL (US); Jonathan Christopher Hull, Bloomington, IL (US); John R. Donovan, Bloomington, IL (US); Richard Jan Tjaden, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,661

(22) Filed: Sep. 18, 2023

(65) Prior Publication Data

US 2024/0003351 A1 Jan. 4, 2024

Related U.S. Application Data

(63) Continuation of application No. 17/245,663, filed on Apr. 30, 2021, now Pat. No. 11,773,856.

(Continued)

(51) Int. Cl.
*F04D 15/02* (2006.01)
*F04D 13/08* (2006.01)
(Continued)

(52) U.S. Cl.
CPC ......... *F04D 15/0227* (2013.01); *F04D 13/08* (2013.01); *F04D 13/086* (2013.01);
(Continued)

(58) Field of Classification Search
CPC .... F04D 15/0218; F04D 13/086; F04D 13/12; F04D 15/0254; F04D 13/08
See application file for complete search history.

(56) References Cited

U.S. PATENT DOCUMENTS 4,624,280 A 11/1986 DePirro
5,591,010 A 1/1997 van Zyl
(Continued)

FOREIGN PATENT DOCUMENTS

CN 111626536 A 9/2020
CN 113138558 A 7/2021
(Continued)

OTHER PUBLICATIONS

APG, Automation Products Group, Inc., "5 Tips on Using an Ultrasonic Level Sensor in a Lift Station," Retrieved from the Internet at: <http://romtecutilities.com/pressure-transducers-for-pump-lift-stations/> on Apr. 26, 2021.
(Continued)

*Primary Examiner* — Connor J Tremarche
(74) *Attorney, Agent, or Firm* — MARSHALL, GERSTEIN & BORUN LLP

(57) ABSTRACT

A sump pump system detects backflow from an outlet pipe in a sump pump system and implements control of the sump pump in light of the detected backflow (or lack thereof). The sump pump system may detect the backflow (or lack thereof) by detecting and comparing water rise rates in a sump basin before activation or engagement of the sump pump (e.g., immediately before the pump starts pumping) and after the pump has disengaged or deactivated (e.g., immediately after the pump stops pumping). The rises rates may be detected via sensors configured to detect motion or acceleration (e.g., accelerometers, inertial measurement units, or force acceleration sensors) placed in the sump basin (Continued)

such that detect motion of water in the basin corresponding to changing water levels.

20 Claims, 3 Drawing Sheets

Related U.S. Application Data

(60) Provisional application No. 63/148,909, filed on Feb. 12, 2021, provisional application No. 63/148,923, filed on Feb. 12, 2021, provisional application No. 63/148,894, filed on Feb. 12, 2021, provisional application No. 63/148,926, filed on Feb. 12, 2021, provisional application No. 63/148,885, filed on Feb. 12, 2021, provisional application No. 63/148,783, filed on Feb. 12, 2021, provisional application No. 63/148,880, filed on Feb. 12, 2021.

(51) Int. Cl.
*F04D 15/00* (2006.01)
*G05B 13/02* (2006.01)
*G05B 15/02* (2006.01)
*G06N 20/00* (2019.01)
*G08B 21/18* (2006.01)
*H04L 12/28* (2006.01)

(52) U.S. Cl.
CPC ..... *F04D 15/0077* (2013.01); *F04D 15/0088* (2013.01); *F04D 15/0209* (2013.01); *F04D 15/0218* (2013.01); *F04D 15/0254* (2013.01); *F04D 15/0272* (2013.01); *G05B 13/021* (2013.01); *G05B 13/026* (2013.01); *G05B 13/0265* (2013.01); *G05B 15/02* (2013.01); *G06N 20/00* (2019.01); *G08B 21/182* (2013.01); *H04L 12/2823* (2013.01)

(56) References Cited

U.S. PATENT DOCUMENTS

| | | |
|---|---|---|
| 5,672,050 A | 9/1997 | Webber et al. |
| 6,167,965 B1 | 1/2001 | Bearden et al. |
| 6,330,525 B1 | 12/2001 | Hays et al. |
| 6,676,382 B2 | 1/2004 | Leighton et al. |
| 7,309,216 B1 | 12/2007 | Spadola, Jr. et al. |
| 7,539,549 B1 | 5/2009 | Discenzo et al. |
| 8,380,355 B2 | 2/2013 | Mayleben et al. |
| 8,490,006 B1 | 7/2013 | Reeser et al. |
| 8,527,306 B1 | 9/2013 | Reeser et al. |
| 8,533,144 B1 | 9/2013 | Reeser et al. |
| 8,640,038 B1 | 1/2014 | Reeser et al. |
| 8,665,084 B2 | 3/2014 | Shapiro et al. |
| 8,890,680 B2 | 11/2014 | Reeser et al. |
| 8,892,263 B1 | 11/2014 | Morris et al. |
| 8,917,186 B1 | 12/2014 | Grant |
| 8,976,937 B2 | 3/2015 | Shapiro et al. |
| 9,049,168 B2 | 6/2015 | Jacob et al. |
| 9,057,746 B1 | 6/2015 | Houlette et al. |
| 9,117,349 B2 | 8/2015 | Shapiro et al. |
| 9,142,119 B1 | 9/2015 | Grant |
| 9,152,737 B1 | 10/2015 | Micali et al. |
| 9,183,578 B1 | 11/2015 | Reeser et al. |
| 9,202,363 B1 | 12/2015 | Grant |
| 9,262,909 B1 | 2/2016 | Grant |
| 9,274,530 B1 | 3/2016 | Morris |
| 9,286,772 B2 | 3/2016 | Shapiro et al. |
| 9,344,330 B2 | 5/2016 | Jacob et al. |
| 9,424,737 B2 | 8/2016 | Bailey et al. |
| 9,443,195 B2 | 9/2016 | Micali et al. |
| 9,472,092 B1 | 10/2016 | Grant |
| 9,589,441 B2 | 3/2017 | Shapiro et al. |
| 9,609,003 B1 | 3/2017 | Chmielewski et al. |
| 9,665,892 B1 | 5/2017 | Reeser et al. |
| 9,666,060 B2 | 5/2017 | Reeser et al. |
| 9,699,529 B1 | 7/2017 | Petri et al. |
| 9,739,813 B2 | 8/2017 | Houlette et al. |
| 9,786,158 B2 | 10/2017 | Beaver et al. |
| 9,798,979 B2 | 10/2017 | Fadell et al. |
| 9,798,993 B2 | 10/2017 | Payne et al. |
| 9,800,570 B1 | 10/2017 | Bleisch |
| 9,800,958 B1 | 10/2017 | Petri et al. |
| 9,812,001 B1 | 11/2017 | Grant |
| 9,888,371 B1 | 2/2018 | Jacob |
| 9,892,463 B1 | 2/2018 | Hakimi-Boushehri et al. |
| 9,898,168 B2 | 2/2018 | Shapiro et al. |
| 9,898,912 B1 | 2/2018 | Jordan, II et al. |
| 9,911,042 B1 | 3/2018 | Cardona et al. |
| 9,923,971 B2 | 3/2018 | Madey et al. |
| 9,942,630 B1 | 4/2018 | Petri et al. |
| 9,947,202 B1 | 4/2018 | Moon et al. |
| 9,978,033 B1 | 5/2018 | Payne et al. |
| 9,997,056 B2 | 6/2018 | Bleisch |
| 10,002,295 B1 | 6/2018 | Cardona et al. |
| 10,042,341 B1 | 8/2018 | Jacob |
| 10,047,974 B1 | 8/2018 | Riblet et al. |
| 10,055,793 B1 | 8/2018 | Call et al. |
| 10,055,803 B2 | 8/2018 | Orduna et al. |
| 10,057,664 B1 | 8/2018 | Moon et al. |
| 10,073,929 B2 | 9/2018 | Vaynriber et al. |
| 10,102,584 B1 | 10/2018 | Devereaux et al. |
| 10,102,585 B1 | 10/2018 | Bryant et al. |
| 10,107,708 B1 | 10/2018 | Schick et al. |
| 10,112,222 B1 | 10/2018 | Davis et al. |
| 10,142,394 B2 | 11/2018 | Chmielewski et al. |
| 10,176,705 B1 | 1/2019 | Grant |
| 10,181,160 B1 | 1/2019 | Hakimi-Boushehri et al. |
| 10,186,134 B1 | 1/2019 | Moon et al. |
| 10,193,546 B1 | 1/2019 | Long |
| 10,198,771 B1 | 2/2019 | Madigan et al. |
| 10,217,068 B1 | 2/2019 | Davis et al. |
| 10,229,394 B1 | 3/2019 | Davis et al. |
| 10,244,294 B1 | 3/2019 | Moon et al. |
| 10,249,158 B1 | 4/2019 | Jordan, II et al. |
| 10,282,787 B1 | 5/2019 | Hakimi-Boushehri et al. |
| 10,282,788 B1 | 5/2019 | Jordan, II et al. |
| 10,282,961 B1 | 5/2019 | Jordan, II et al. |
| 10,295,431 B1 | 5/2019 | Schick et al. |
| 10,296,978 B1 | 5/2019 | Corder et al. |
| 10,297,138 B2 | 5/2019 | Reeser et al. |
| 10,304,313 B1 | 5/2019 | Moon et al. |
| 10,323,860 B1 | 6/2019 | Riblet et al. |
| 10,325,473 B1 | 6/2019 | Moon et al. |
| 10,332,059 B2 | 6/2019 | Matsuoka et al. |
| 10,346,811 B1 | 7/2019 | Jordan, II et al. |
| 10,353,359 B1 | 7/2019 | Jordan, II et al. |
| 10,356,303 B1 | 7/2019 | Jordan, II et al. |
| 10,387,966 B1 | 8/2019 | Shah et al. |
| 10,388,135 B1 | 8/2019 | Jordan, II et al. |
| 10,412,169 B1 | 9/2019 | Madey et al. |
| 10,446,000 B2 | 10/2019 | Friar et al. |
| 10,467,476 B1 | 11/2019 | Cardona et al. |
| 10,469,282 B1 | 11/2019 | Konrardy et al. |
| 10,480,825 B1 | 11/2019 | Riblet et al. |
| 10,482,746 B1 | 11/2019 | Moon et al. |
| 10,506,411 B1 | 12/2019 | Jacob |
| 10,514,669 B1 | 12/2019 | Call et al. |
| 10,515,372 B1 | 12/2019 | Jordan, II et al. |
| 10,522,009 B1 | 12/2019 | Jordan, II et al. |
| 10,546,478 B1 | 1/2020 | Moon et al. |
| 10,547,918 B1 | 1/2020 | Moon et al. |
| 10,565,541 B2 | 2/2020 | Payne et al. |
| 10,573,146 B1 | 2/2020 | Jordan, II et al. |
| 10,573,149 B1 | 2/2020 | Jordan, II et al. |
| 10,579,028 B1 | 3/2020 | Jacob |
| 10,586,177 B1 | 3/2020 | Choueiter et al. |
| 10,607,295 B1 | 3/2020 | Hakimi-Boushehri et al. |
| 10,634,576 B1 | 4/2020 | Schick et al. |
| 10,664,922 B1 | 5/2020 | Madigan et al. |
| 10,679,292 B1 | 6/2020 | Call et al. |
| 10,685,402 B1 | 6/2020 | Bryant et al. |
| 10,699,346 B1 | 6/2020 | Corder et al. |

(56) References Cited

U.S. PATENT DOCUMENTS

| | | | |
|---|---|---|---|
| 10,699,348 B1 | 6/2020 | Devereaux et al. | |
| 10,726,494 B1 | 7/2020 | Shah et al. | |
| 10,726,500 B1 | 7/2020 | Shah et al. | |
| 10,733,671 B1 | 8/2020 | Hakimi-Boushehri et al. | |
| 10,733,868 B2 | 8/2020 | Moon et al. | |
| 10,735,829 B2 | 8/2020 | Petri et al. | |
| 10,740,691 B2 | 8/2020 | Choueiter et al. | |
| 10,741,033 B1 | 8/2020 | Jordan et al. | |
| 10,750,252 B2 | 8/2020 | Petri et al. | |
| 10,795,329 B1 | 10/2020 | Jordan, II et al. | |
| 10,796,557 B2 | 10/2020 | Sundermeyer et al. | |
| 10,802,477 B1 | 10/2020 | Konrardy et al. | |
| 10,804,700 B2 | 10/2020 | Cohen et al. | |
| 10,818,105 B1 | 10/2020 | Konrardy et al. | |
| 10,823,458 B1 | 11/2020 | Riblet et al. | |
| 10,824,971 B1 | 11/2020 | Davis et al. | |
| 10,825,320 B1 | 11/2020 | Moon et al. | |
| 10,825,321 B2 | 11/2020 | Moon et al. | |
| 10,832,225 B1 | 11/2020 | Davis et al. | |
| 10,846,800 B1 | 11/2020 | Bryant et al. | |
| 10,907,844 B2 | 2/2021 | Ribbich et al. | |
| 10,922,756 B1 | 2/2021 | Call et al. | |
| 10,922,948 B1 | 2/2021 | Moon et al. | |
| 10,943,447 B1 | 3/2021 | Jordan, II et al. | |
| 10,970,990 B1 | 4/2021 | Jacob | |
| 10,990,069 B1 | 4/2021 | Jacob | |
| 11,003,334 B1 | 5/2021 | Conway et al. | |
| 11,004,320 B1 | 5/2021 | Jordan, II et al. | |
| 11,015,997 B1 | 5/2021 | Schick et al. | |
| 11,017,480 B2 | 5/2021 | Shah et al. | |
| 11,042,137 B1 | 6/2021 | Call et al. | |
| 11,042,942 B1 | 6/2021 | Hakimi-Boushehri et al. | |
| 11,043,098 B1 | 6/2021 | Jordan, II et al. | |
| 11,049,078 B1 | 6/2021 | Jordan, II et al. | |
| 11,049,189 B2 | 6/2021 | Shah et al. | |
| 11,074,659 B1 | 7/2021 | Hakimi-Boushehri et al. | |
| 11,100,594 B1 | 8/2021 | West et al. | |
| 11,118,812 B1 | 9/2021 | Riblet et al. | |
| 11,126,708 B2 | 9/2021 | Reimer | |
| 11,164,257 B1 | 11/2021 | Devereaux et al. | |
| 11,232,873 B1 | 1/2022 | Aspro et al. | |
| 11,277,465 B2 | 3/2022 | Chmielewski et al. | |
| 11,348,193 B1 | 5/2022 | Konrardy et al. | |
| 11,417,212 B1 | 8/2022 | Farooqui et al. | |
| 11,788,535 B1 | 10/2023 | Tofte et al. | |
| 2003/0049134 A1 | 3/2003 | Leighton et al. | |
| 2004/0064012 A1* | 4/2004 | Yanai | A61M 60/546 600/16 |
| 2004/0090197 A1 | 5/2004 | Schuchmann | |
| 2004/0221647 A1 | 11/2004 | Sabatino | |
| 2007/0239371 A1 | 10/2007 | Halbinger et al. | |
| 2008/0229819 A1 | 9/2008 | Mayleben et al. | |
| 2009/0074338 A1 | 3/2009 | Hagshenas et al. | |
| 2009/0123295 A1 | 5/2009 | Abbott | |
| 2009/0265193 A1 | 10/2009 | Collins et al. | |
| 2011/0077875 A1 | 3/2011 | Tran et al. | |
| 2011/0110794 A1 | 5/2011 | Mayleben et al. | |
| 2011/0156921 A1 | 6/2011 | Kyllingstad | |
| 2012/0260729 A1* | 10/2012 | Bayley | G01F 23/363 73/307 |
| 2013/0197700 A1* | 8/2013 | Kochan, Jr. | F04B 49/065 700/282 |
| 2014/0202243 A1 | 7/2014 | Leonard et al. | |
| 2014/0266669 A1 | 9/2014 | Fadell et al. | |
| 2014/0343736 A1 | 11/2014 | Meyer | |
| 2015/0061859 A1 | 3/2015 | Matsuoka et al. | |
| 2015/0253216 A1 | 9/2015 | Shinoda et al. | |
| 2015/0347910 A1 | 12/2015 | Fadell et al. | |
| 2015/0377692 A1 | 12/2015 | Cooper | |
| 2016/0076535 A1 | 3/2016 | Clifton et al. | |
| 2016/0333884 A1 | 11/2016 | Hussain et al. | |
| 2017/0075363 A1 | 3/2017 | Steinke | |
| 2017/0100632 A1 | 4/2017 | Castelo Branco et al. | |
| 2017/0107989 A1 | 4/2017 | Coste | |
| 2017/0179724 A1 | 6/2017 | Lam | |
| 2017/0322104 A1 | 11/2017 | Mataga et al. | |
| 2017/0335550 A1* | 11/2017 | Sterling | E03B 7/072 |
| 2017/0342812 A1 | 11/2017 | Kuhn | |
| 2018/0072384 A1 | 3/2018 | von Mueller | |
| 2018/0141069 A1* | 5/2018 | Lemkin | G05D 7/0676 |
| 2018/0168119 A1 | 6/2018 | Hartfelder et al. | |
| 2018/0223863 A1 | 8/2018 | Weber et al. | |
| 2018/0247513 A1 | 8/2018 | Calvert et al. | |
| 2018/0363639 A1 | 12/2018 | Cathell et al. | |
| 2018/0375680 A1 | 12/2018 | Wright et al. | |
| 2019/0101427 A1* | 4/2019 | Beger | G01F 23/0023 |
| 2019/0167059 A1 | 6/2019 | Brown et al. | |
| 2019/0203736 A1 | 7/2019 | Hambe et al. | |
| 2019/0242374 A1 | 8/2019 | Guetter | |
| 2019/0251520 A1 | 8/2019 | Bentley, III et al. | |
| 2019/0353156 A1* | 11/2019 | Ward | F04D 13/08 |
| 2020/0003217 A1 | 1/2020 | Wilds | |
| 2020/0023395 A1 | 1/2020 | Tangen et al. | |
| 2020/0240418 A1 | 7/2020 | Correia | |
| 2020/0302549 A1 | 9/2020 | Jordan, II et al. | |
| 2020/0327791 A1 | 10/2020 | Moon et al. | |
| 2021/0035432 A1 | 2/2021 | Moon et al. | |
| 2021/0042843 A1 | 2/2021 | Bryant et al. | |
| 2021/0158671 A1 | 5/2021 | Jordan, II et al. | |
| 2021/0262185 A1 | 8/2021 | Adler et al. | |
| 2021/0279811 A1 | 9/2021 | Waltman et al. | |
| 2021/0312789 A1 | 10/2021 | Linn | |
| 2022/0101275 A1 | 3/2022 | Aspro et al. | |

FOREIGN PATENT DOCUMENTS

| | | |
|---|---|---|
| JP | 2003157357 A | 5/2003 |
| KR | 20150129845 A | 11/2015 |
| WO | WO-2014159131 A2 | 10/2014 |
| WO | WO-2016081511 A2 | 5/2016 |
| WO | WO-2017/173463 A1 | 10/2017 |
| WO | WO-2021087185 A1 | 5/2021 |

OTHER PUBLICATIONS

LevelGuard, Fluid Control Products, "Reliable Liquid Level Sensing Solutions," Retrieved from the Internet at: <https://www.levelguardproducts.com/> on Apr. 26, 2021.

Adafruit, "Assembled Adafruit HUZZAH32—ESP32 Feather Board—with Stacking Headers," Retrieved from the Internet at: <https://www.adafruit.com/product/3619> on Apr. 26, 2021.

The Basement Watchdog, "Connected Pumps," Retrieved from the Internet at: <https://www.adafruit.com/product/3619> on Apr. 26, 2021.

Flowline™, "Municipal Sewer Pump Station Radar Level Sensor," Retrieved from the Internet at: <https://www.flowline.com/municipal-sewer-lift-station-radar-level-transmitter/> on Apr. 26, 2021.

Romtec Utilities, "Pressure Transducers for Pump & Lift Stations," Retrieved from the Internet at: <https://www.flowline.com/municipal-sewer-lift-station-radar-level-transmitter/> on Apr. 26, 2021.

The Home Depot, "1/2 HP Submersible 12-Volt DC WiFi Connected Battery Backup Sump Pump and Monitoring System," Retrieved from the Internet at: <https://www.homedepot.com/p/PumpSpy-1-2-HP-Submersible-12-Volt-DC-WiFi-Connected-Battery-Backup-Sump-Pump-and-Monitoring-System-PS2000/310520482> on Apr. 26, 2021.

\* cited by examiner

DETECTING AND UTILIZING A RISE RATE FOR SUMP PUMP SYSTEM CONTROL

CROSS-REFERENCE TO RELATED APPLICATIONS

This application is a continuation of U.S. patent application Ser. No. 17/245,663, filed Apr. 30, 2021, entitled "DETECTING AND UTILIZING A RISE RATE FOR SUMP PUMP SYSTEM CONTROL," which claims priority to (i) U.S. Provisional Application Ser. No. 63/148,783, filed Feb. 12, 2021, entitled "DETECTING AND UTILIZING A RISE RATE FOR SUMP PUMP SYSTEM CONTROL," (ii) U.S. Provisional Application Ser. No. 63/148,880, filed Feb. 12, 2021, entitled "DETECTING AND UTILIZING WATER VIBRATIONS IN SUMP PUMP SYSTEM CONTROL," (iii) U.S. Provisional Application Ser. No. 63/148,885, filed Feb. 12, 2021, entitled "DETECTING AND UTILIZING VIBRATION PATTERNS OF SUMP PUMPS," (iv) U.S. Provisional Application Ser. No. 63/148,894, filed Feb. 12, 2021, entitled "ADAPTIVE LEARNING SYSTEM FOR IMPROVING SUMP PUMP CONTROL," (v) U.S. Provisional Application Ser. No. 63/148,909, filed Feb. 12, 2021, entitled "DETERMINING AND UTILIZING A DESIRED FREQUENCY FOR A MECHANICAL SHAKER FOR A SUMP PUMP SYSTEM," (vi) U.S. Provisional Application Ser. No. 63/148,923, filed Feb. 12, 2021, entitled "SYSTEMS AND METHODS FOR MANIPULATING CONTROL OF SUMP PUMPS TO EXTEND LIFESPANS OF SUMP PUMPS," and (vii) U.S. Provisional Application Ser. No. 63/148,926, filed Feb. 12, 2021, entitled "SUMP PUMP SMART HOME INTEGRATION," the entire disclosures of which are expressly incorporated herein by reference.

TECHNICAL FIELD

The present application relates generally to sump pumps and, more particularly, to systems and methods for detecting a backflow condition in sump pumps and implementing control based on the detected backflow condition.

BACKGROUND

A sump pump is a type of pump used to remove water that has accumulated at a ground level or below ground level (e.g., a basement) of a property (e.g., a home, an office, or any other building or structure). The sump pump sends the water into pipes that lead away from the property so that potential flooding may be avoided. As such, failures in the sump pump can have disastrous consequences including water damages and insurance losses. However, sump pump failures often occur without prior warning or may not be discovered until significant damage has already been done. Unfortunately, many currently available sump pump systems are not designed or equipped to automatically detect impending sump pump failures, or remedy such failures even if they are detected. Accordingly, there is a need for systems and methods for detecting and resolving sump pump failures.

SUMMARY

The described methods and systems enable detection of backflow from an outlet pipe in a sump pump system, and enable control of the sump pump based on the determined backflow (or lack thereof). A sump pump system may implement the disclosed techniques to detect backflow (or lack thereof) by detecting and comparing water rise rates in a sump basin before activation or engagement of the sump pump (e.g., immediately before the pump starts pumping) and after the pump has disengaged or deactivated (e.g., immediately after the pump stops pumping).

In an embodiment, a system detects and utilizes rise rates when implementing control of a sump pump. The system may include a sump pump that is disposed in a sump basin and configured to pump water out of the sump basin via an outlet pipe. The system may include a sensor that is disposed in the sump basin and configured to detect acceleration. The system may include a sump pump control system that is coupled to the sump pump and the sensor. The sump pump control system may be configured to: detect, via the sensor, a first rise rate of water in the sump basin during a first time period before an activation of the sump pump; detect, via the sensor, a second rise rate of the water in the sump basin during a second time period after a deactivation of the sump pump; detect, based on a comparison of the first rise rate to the second rise rate, a backflow condition indicating whether or not water is backflowing into the sump basin from the outlet pipe; and/or implement control based on the detected backflow condition.

In an embodiment, a method for detecting and utilizing rise rates is implemented. The method may include any one or more of: detecting, via a sensor disposed in a sump basin and configured to detect acceleration, a first rise rate of water in the sump basin during a first time period before an activation of a sump pump; detecting, via the sensor, a second rise rate of the water in the sump basin during a second time period after a deactivation of the sump pump; detecting, based on a comparison of the first rise rate to the second rise rate, a backflow condition indicating whether or not water is backflowing into the sump basin from an outlet pipe; and/or implementing control, via the sump pump control system, based on the detected backflow condition.

Note, this summary has been provided to introduce a selection of concepts further described below in the detailed description. As explained in the detailed description, certain embodiments may include features and advantages not described in this summary, and certain embodiments may omit one or more features or advantages described in this summary

Figure 1:
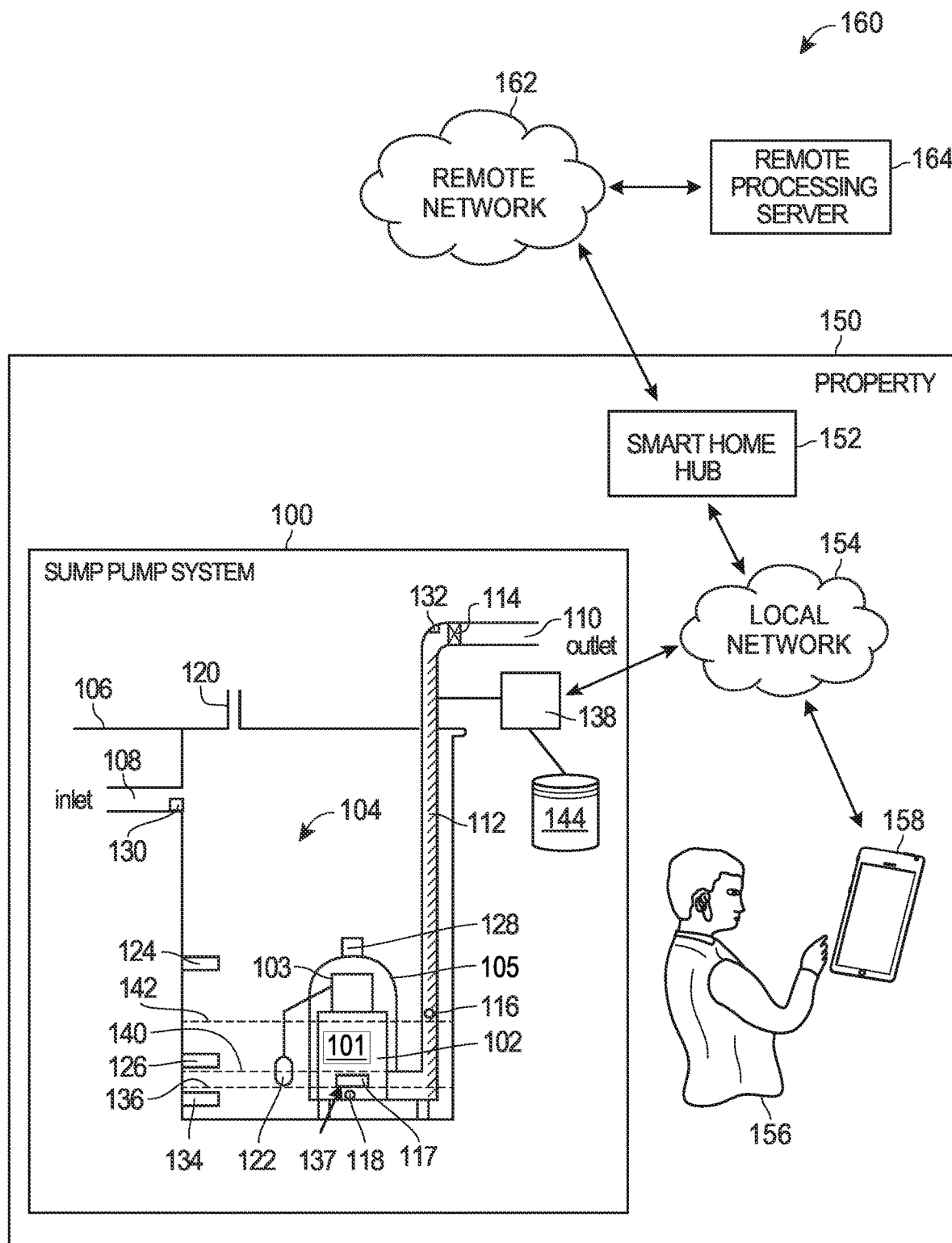
FIG. 1 illustrates an example sump pump system constructed in accordance with disclosed embodiments, and shown in an example sump pump network system.

The figures depict embodiments of this disclosure for purposes of illustration only. One skilled in the art will readily recognize from the following discussion that alternate embodiments of the structures and methods illustrated herein may be employed without departing from the principles set forth herein. In general, the same reference numbers will be used throughout the drawing(s) and accompanying written description to refer to the same or like parts. The figures are not to scale. Connecting lines or connectors shown in the various figures presented are intended to represent example functional relationships and/or physical or logical couplings between the various elements.

DETAILED DESCRIPTION

The disclosed techniques enable the detection of backflow from an outlet pipe in a sump pump system, as well as control of a sump pump in light of detected backflow (or detected lack of backflow). A sump pump system may implement the disclosed techniques to detect backflow (or lack thereof) by detecting and comparing water rise rates in a sump basin before and after activation of the sump pump.

At a high level, the disclosed systems may implement sensor(s) configured to detect motion (e.g., acceleration), which can be analyzed to calculate the water rise rates. These sensors may be accelerometers, gyroscopes, inertial measurement units (IMUs), or force acceleration sensors. Generally speaking, the sensor(s) may be disposed on or within the water, and may be responsive to the water such that, when the water level rises or drops, the sensor(s) responsively and proportionally drop. One can generally assume that the backflow is zero shortly before water in a sump basin hits a high-water mark that triggers activation of the sump pump (because, presumably, the sump pump has been disengaged for a long enough period of time that, to the extent backflow is allowed via the outlet pipe, all of the water that could have backflowed into the sump basin via the outlet pipe has already done so). Further, if a faulty check valve is allowing backflow, backflow most likely presents itself immediately after the sump pump disengages after pumping. As a result, if backflow is a problem, the water rise rate immediately after disengaging will result from the sum of the backflow rate and the standard in-flow rate from inlet pipes, and the water rise rate immediately before engaging will not include the backflow rate (that is, the water rise rate at that time is likely exclusively attributable to the standard in-flow rate). Consequently, the water rate at a time shortly before engagement can be compared to (e.g., subtracted from) the water rise rate shortly after disengagement to detect backflow. If these two water rise rates are roughly the same, one can conclude little or no backflow is occurring. Alternatively, if a significant difference between the two exists, this suggests the sump pump system suffers from backflow.

Generally speaking, disclosed systems automatically detect and resolve failures in sump pump systems. Sump pumps are used in areas where lower level flooding (e.g., ground level or below ground level) may be a problem and/or is a recurring problem. A typical sump pump system comprises a submersible impeller type pump disposed in a sump basin. The sump basin is a holding cavity formed by digging a recess into the floor of a lower level of a property, such as a ground level or below ground level (e.g., a basement) of a property (e.g., a home, an office, or any other building or structure). The sump basin acts both to house the sump pump and to collect accumulated water. Water may accumulate in the sump basin when excessive amounts of rain, snow melt or ground water saturate the soil adjacent to the property and/or property lower level floor. Water may also enter the sump basin via drainage pipes that have been placed into the ground to divert any excess water into the sump basin before the water can begin to permeate foundation walls, floors, etc., or water may enter the sump basin through porous or cracked walls, floors, etc. In any event, the sump pumping action of a sump pump removes water accumulated in the sump basin so that potential lower level flooding may be avoided. When water is pumped out of the sump basin, the water is discharged via pipes to an area away from the property such as into a municipal storm drain, a dry well, a water retention area, etc.

Turning to the figures, FIG. 1 illustrates an example sump pump system 100 that can be used to remove water accumulated in a lower level of a property 150 (e.g., a home, an office, or any other building or structure). As shown in FIG. 1, the sump pump system 100 may be part of an example sump pump network system 160.

The example sump pump system 100 includes a sump pump 102 located in a sump basin 104. The sump pump 102 and a sump pump motor 103 are enclosed in a housing 105. The sump pump motor 103 may also be referred to herein as the motor 103, and the sump pump 102 may also be referred to herein as the pump 102. While the sump pump 102 in FIG. 1 is shown as a submersible type sump pump (e.g., where the motor 103 and the sump pump 102 are mounted inside the basin 104), the sump pump 102, in general, may be any type of sump pump, such as a pedestal type sump pump that is mounted above or outside of the basin 104. As shown in FIG. 1, the sump basin 104 is a well-like cavity or hole formed through a floor 106 of the property 150. The example sump pump system 100 also includes a water inlet pipe 108 terminating at the sump basin 104, and a discharge pipe 112 (also referred to herein as an outlet pipe) connected to the sump pump 102 to carry water out of the sump basin 104. An impeller 117 of the sump pump 102 draws in water through an inlet 118, and pumps the water up the discharge pipe 112 to an outlet 110. In the illustrated example, the discharge pipe 112 extends upward from the sump pump 102 and then out of the building. However, other arrangements may be used. The discharge pipe 112 is outfitted with a check valve 114. The check valve 114 allows water to flow up through the discharge pipe 112, but does not allow the water in the discharge pipe 112 to flow back into the sump basin 104 when the sump pump 102 is off. A weep hole 116 in the discharge pipe 112 allows excess air to escape from the pipe, preventing air binding, also known as air locking. The opening of the sump basin 104 may be protected by a cover to prevent objects from falling into the basin, and to keep noxious gases (e.g., radon) from entering the property 150. In the case of a sealed sump pump basin 104, an air vent 120 may be needed to relieve excess air pressure in the basin.

Generally, the sump pump 102 may be electrically powered and hardwired into the electrical system of the property 150. Additionally and/or alternatively, the sump pump 102 may be powered by a battery or other independent power source (not shown for clarity of illustration). The operation of the sump pump 102 is controlled by a pump activation switch 122 in response to a water level in the basin 104. For example, the sump activation switch 122 may activate the sump pump 102 when a water level in the sump basin 104 reaches a preset level. The preset level is determined by the placement of the sump pump activation switch 122. In illustrated example of FIG. 1, the sump pump activation switch 122 is shown in the form of a float switch, although other technologies such as liquid level sensors may also be used.

As shown in FIG. 1, the sump pump activation switch 122 is connected to the motor 103 of the sump pump 102. In some embodiments, the sump pump activation switch 122 is a level sensor, such as a float switch. When the rising water in the basin 104 lifts a float of the sump pump activation switch 122 to a high water level or mark 142, the float rises a rod, which activates and/or energizes the motor 103 to begin pumping water. In other embodiments, the sump pump activation switch 122 may be a mercury tilt switch. The rising water in the basin 104 lifts and tilts a float of the sump pump activation switch 122 and, when the float reaches the high water level or mark 142, a sufficient tilt causes a small amount of liquid mercury to slide towards open electrodes to close an electrical circuit, which activates and/or energizes the motor 103. As water is pumped out of the sump basin 104, the water level drops to a low or initial water level or mark 140. The falling water level carries the sump pump activation switch 122 back to an initial or low water level or mark 140, at which the sump pump activation switch 122 is deactivated. Thus, the motor 103 de-energizes or shuts off at the initial or low water level or mark 140.

When the sump pump 102 and/or the motor 103 fails, flooding may ensue as water fills up the sump basin 104 and overflows above the floor level 106 of the property 150. The amount of water that overflows can vary from a few inches to several feet, which may result in substantial water damage to the structures of property 150, as well as personal belongings. Accordingly, the ability to maintain sump pumps, and to detect and resolve impending sump pump failures before they occur is of great importance to the property owners and the building and property insuring parties.

The sump pump 102 may fail because of a failure in the motor 103, which renders the entire sump pump 102 inoperable. The failure in the motor 103 may be caused by various factors such as age, fatigue, overheating, poor maintenance, etc. Aside from the failure of the motor 103, the sump pump 102 may fail because of other soft mechanical failures of the components of the sump pump system 100. For example, sediment or debris build-up may cause the motor impeller 117 and/or another sump pump component to stall, thus, rendering the sump pump 102 unable to pump water even though the motor 103 is operational. Additionally or alternatively, the sump pump activation switch 122 may fail to engage in response to the rising water level and subsequently fail to actuate the motor 103. Additionally or alternatively, the check valve 114 may malfunction, and back flow of the discharged water into the sump pump basin 104 may equal or exceed the amount of water being pumped out by the sump pump 102. Additionally or alternatively, there might be a blockage in the discharge pipe 112, preventing water flow to the outlet 110. Additionally and/or alternatively, an air pocket may cause the sump pump 102 to run dry. As such, mechanisms to maintain the sump pump and/or detect impending sump pump failures may include monitoring for the occurrence of such failures.

Generally, soft mechanical failures may be identified or detected indirectly. In an embodiment, soft mechanical failures may be detected by using properly placed sensors, such as sensors 124, 126, 128, 130, 132, and 134 of FIG. 1, able to detect issues associated with failures of the sump pump system 100. The sensors 124, 126, 128, 130, 132, and 134 may be configured to communicate with a sump pump controller 138, which may be configured to communicate with other components of the sump pump system 100, or components of a sump pump network system 160, described below. The sump pump controller 138 may also be referred to in this specification as the controller 138. The controller 138 is configured to receive and analyze data from the sensors 124, 126, 128, 130, 132, and 134 using built-in computing capabilities or in cooperation with other computing devices of the sump pump network system 160 to identify specific failures of the sump pump system 100, and in some instances remediate the issues, and/or generate an alert regarding the detected failures. Interactions between the sensors 124, 126, 128, 130, 132, and 134, the controller 138, and the components of the system 160 are discussed below in more detail.

Example remedies to soft mechanical failures (such as a blockage or stuck impeller) may include activating a shaker, altering a speed of a pump impeller, reversing a direction of spin of the pump impeller, gradually accelerating the impeller, or alternating gradual accelerations of the impeller with gradual decelerations. If desired, the sump pump system 100 may include a variable speed motor or controller for the sump pump 102. In an embodiment, the sump pump motor 103 is a variable speed motor; in an embodiment, it is not. Similarly, in an embodiment, the sump pump controller 138 is a variable speed controller; in an embodiment, it is not.

For example, in embodiments in which the pump impeller is reversed or adjusted in speed, a variable speed motor or controller may be included for controlling the pump and/or pump impeller in such a manner. In some embodiments, a variable speed motor or controller may detect a blocked impeller by sensing that the position of the rotor or impeller is not changing even though power is applied. To dislodge the mechanical blockage, the controller may spin the motor in reverse direction or alternate gradual acceleration with gradual deceleration in opposite directions. Gradual acceleration upon motor activation and gradual deceleration upon motor disengagement may reduce initial step level force impact of the pump turning on or off, which may benefit the system by lengthening the serviceable life of the motor and the marginal pipe infrastructure.

As shown in FIG. 1, the sump pump system 100 may include a variety of mechanical, electrical, optical, or any other suitable sensors 124, 126, 128, 130, 132, and 134 disposed within, at, throughout, embedded within, or in mechanical connection to the sump basin 104, the sump pump housing 105, the inlet pipe 108, or the discharge pipe 112. Additionally, the sensors 124, 126, 128, 130, 132, and 134 may be disposed on, at, or within the motor 103, the sump pump 102, or any other components of the sump pump system 100. The one or more sensors 124, 126, 128, 130, 132, and 134 may transduce one or more of: light, sound, acceleration, translational or rotational movement, strain, pressure, presence of liquid, or other suitable signals into electrical signals. The sensors 124, 126, 128, 130, 132, and 134 may be acoustic, photonic, micro-electro-mechanical systems (MEMS) sensors, or any other suitable type of sensor.

The sensor 124 may be a water level sensor, placed a short distance (e.g., 10, 20, 30, or 50 mm above) above the high water level or mark 142 in the sump basin 104. In operation, if the water level sensor 124 does not detect water, then the water level in the basin 104 is deemed adequate. In other words, the sump pump 102 is either working properly to constantly pump water out of the basin 104, or the water level is not yet high enough to activate the sump pump 102. In any event, it can be assumed that the sump pump 102 is not experiencing any soft mechanical failure. On the other hand, if the water level sensor 124 detects water, then water may be on the rise in the basin 104, and may overflow the sump basin 104. In other words, a dangerous level of water is present in the sump basin 104, which may be due to either a failure of the sump pump 102, a failure to activate the sump pump 102, and/or a soft mechanical failure that has rendered the sump pump 102 unable to pump out adequate amount of water.

The sensor 124 may include magnetic or mechanical floats, pressure sensors, optical, ultrasonic, radar, capacitance, electroconductive and/or electrostatic sensors. The sensor 124 may be a continuous or a point level switch. A continuous liquid level switch or sensor provides a continuous feedback showing liquid level within a specified range. A point level switch detects whether a liquid level is above or below a certain sensing point. In embodiments, the sensor 124 may be a reed switch, or a mercury switch, a conductive level sensor, and/or any type of a suitable switch that changes a state from inactive to active as liquid level reaches a certain level relative to the switch position.

In some embodiments, the sensor 124 may be a continuous liquid level switch providing a measurement of the height of the water level inside the sump basin 104. The controller 138 can use these measurements, taken at time intervals (e.g., at 1, 5, or 10 second intervals), to estimate the volume of water being pumped, deposited, or backflowing in the sump basin 104. For example, knowing the sump pump basin 104 dimensions, such as a diameter (if the basin is a cylinder), or the bottom diameter, a top diameter, and a height (if the basin is a graduated cylinder) or width and length measurements (if the basin is a rectangular prism), and water level height over time will yield a measurement of water volume increase or decrease over time. The controller 138 may utilize any suitable volume formula to calculate changes in volume (e.g., volume=$\pi r^2 h$ for a cylinder). For example, if the basin 104 is a cylinder basin, the controller 138 may be programmed to assume a known radius (e.g., 8 inches). The controller 138 may identify the distance from the bottom of the basin 104 to the water level (e.g., based on a water level sensor). This distance may be used for the "h" variable in the volume formula, enabling the controller 138 to calculate volume at any given time it can detect the "height" of the water level. In some instances, the controller 138 may be configured to account for displacement that occurs due to the pump itself being submerged within water. For example, a known volume of the pump (which is generally static) may be subtracted from a formula that assumes a perfect cylinder.

Additionally, knowing the sump basin 104 capacity (e.g., in gallons) and water volume increase over time, the controller 138 may calculate an estimate of when the sump pump basin may overflow. For example, in a sump basin with a capacity of 26 gallons and an initial water volume of 0 gallons, the controller 128 may calculate that a water volume increase at 0.1 gallons per second would result in a sump basin overflow in 260 seconds or 4 minutes and 20 seconds. The sump pump controller 138 may generate an alert, communicating an approximated time of the critical event of the sump basin 104 overflowing, or communicating the time (e.g., in minutes or seconds) remaining until the estimated overflow.

Additionally, functions of the sump pump controller 138 of FIG. 1 may be used together with the water level sensor 124 to detect certain soft mechanical failures, such as when the sump motor 103 becomes stuck and runs indefinitely. This may be due to a mechanical malfunction of the sump pump activation switch 122 or another activation element. In this scenario, when the water level sensor 124 does not detect water, the sump pump controller 138 may analyze the electrical load waveform of the motor 103 to determine how long the motor 103 is running. In general, if the sump pump 102 is working properly, then the motor 103 will automatically shut off when the falling water carries the sump pump activation switch 122 back to the initial or low level or mark 140. However, if the sump pump activation switch 122 jams or otherwise fails, then the sump motor 103 may become stuck and continue to run for a long time. Thus, if the water level sensor 124 is not detecting water but the sump pump controller 138 is detecting a long period of run time on the part of the sump motor 103 (e.g., if the run time of the sump motor 103 exceeds a certain length of time), then the sump pump 102 may be deemed to be experiencing a soft mechanical failure.

The sensor 126 may be a force sensor or transducer, configured to detect a water rise or fall rate in the sump basin 104, or water disturbance (e.g., splashing) in the sump basin 104. The sensor 126 may be, for example a piezoelectric crystal, a pneumatic, a hydraulic, an inductive, a capacitive, a magnetostrictive, or a strain gage load cell, or an accelerometer, or any other suitable sensor capable of transducing a force into an electrical signal. In an embodiment, an accelerometer of the sensor 126 measures inertial acceleration, from which water rise rate in the sump basin 104 can be determined.

The sensor 126 may be placed above the initial or low water level or mark 140 and, for example, below the high water level or mark 142 in the sump basin 104. Alternatively, the sensor 126 may be placed above the high water level or mark 142 in the sump basin 104.

In operation, a rising water level in the sump basin 104 would exert a load on the sensor 126, from which a rise or fall rate of the water level in the sump basin 104 can be determined. If the sensor 126 does not detect any force exerted on it, there may be no water at the level of the sensor 126. Alternatively, the water level at the sensor 126 in the sump basin 104 may be constant. In other words, water rise rate, or inflow rate may equal the rate of water pumped out through the discharge pipe 112 by the sump pump 102. In an alternative scenario, the sensor 126 may sense an upward force of the rising water level when the sump pump 102 is operational, and an inlet sensor 130 (described later in more detail) detects water entering the sump basin 104 from the inlet 108, indicating that the inflow rate is greater than the rate of water pumped out through the discharge pipe 112 by the sump pump 102. In yet another scenario, the sensor 126 may sense rising water, the inlet sensor 130 may not detect any water inflow into the sump basin 104, and at the same time the sump pump 102 may be engaged, the scenario indicating that the water level is rising due to additional inflow (e.g., back flow from the discharge pipe, or the vent 120, or through the floor 106 opening of an uncovered sump basin).

The sump pump system 100 may include a vibration sensor 128, placed in direct or indirect contact with the sump pump 102 or pump motor 103. FIG. 1 shows the vibration sensor 128 located on the sump pump housing 105. In some embodiments, the vibration sensor 128 may be placed on the motor 103, the sump pump 102, the discharge pipe 112, or on any component within the sump basin 104. The vibration sensor 128 may be a ceramic piezoelectric sensor, or any suitable sensor capable of detecting vibration or acceleration of motion of a structure. In operation, by measuring the inertial vibration, the vibration sensor 128 monitors the condition, predicts or monitors wear, fatigue, and failure of the sump pump system 100 components, for example sump pump 102, the motor 103, the housing 105, or the discharge pipe 112 and their respective constituents by measuring their vibrational signatures and, thus, determining the kinetic energy and forces acting upon the components. The inertial vibration signatures, when compared to a standard or when monitored for changes over time, may predict wear, impending failures, and immediate failures, such as a loose bearing, a stuck motor 103, an overloaded motor 103, a dry motor 103, a damaged discharge pipe 112, a faulty check valve 114, a broken hermetic seal of the housing 105, a stuck impeller 117, debris on the impeller 117 or inside the sump pump 102, etc.

The inlet sensor 130 and the outlet sensor 132 of the sump pump system 100 may be water level sensors, analogous to the water level sensor 124. In operation, the sensor 130 detects presence of water in the inlet pipe 108, or inflow. If the sensor 130 does not detect water in the inlet pipe 108, there is no water flowing into the sump basin 104 via the inlet pipe 108. FIG. 1 shows the sensor 130 placed on the surface of the inlet pipe 108. In some embodiments, the sensor 130 may be embedded within the water inlet pipe 108, or placed at the junction of the inlet pipe 108 and the wall of the sump basin 104. In some embodiments, the sensor 130 may include a hinged flap or a hinged lid (not shown) covering the opening of the inlet pipe 108. When the pressure of the inflowing water lifts the flap, the displacement of the flap triggers a signal that water is flowing into the sump basin 104 via the inlet pipe 108. The flap displacement may be registered, for example, in the hinge mechanism (e.g., by breaking or establishing an electrical connection by the movement of the hinge parts), or as a disconnected electrical or a magnetic connection between the flap and the inlet pipe 108 or the wall of the sump basin 104. Alternatively, the sensor 130 may be a sensor configured to detect deflection of the flap (e.g., with a laser-based or an acoustic technology).

The outlet sensor 132 detects presence of water in the discharge pipe 112 before the check valve 114, monitoring whether the check valve 114 is working properly, i.e., preventing the back flow of water into the sump basin 104 when the motor 103 is disengaged and the sump pump 102 is not operating. FIG. 1 shows the sensor 132 placed inside the discharge pipe 112 before, or closer to the sump pump 102 than the check valve 114. In operation, if the sensor 132 does not detect water when the sump pump 102 is deactivated, then the check valve 114 may be assumed to be functioning properly.

The sensor 134 may be a water level sensor, placed at a level or mark 136 in the sump basin 104 corresponding to the bottom 137 of the impeller 117 and/or another sump pump component of the sump pump 102, which is below the low or initial water level or mark 140. In operation, if the sensor 134 does not detect water, then the current water level in the basin 104 may be deemed adequately low to avoid, prevent, reduce, etc. corrosion of the impeller 117 and/or another sump pump component due to standing water in the sump basin 104. On the other hand, if the water level sensor 134 detects water, then at least a portion of the impeller 117 and/or another sump pump component may be currently exposed to water and a condition for potential corrosion may exist. Alternatively, the sensor 134 may be a force sensor or transducer and configured to detect a water rise or fall rate, water movement (e.g., a disturbance, splashing, sloshing, ripples, etc.) in the sump basin 104 due to the sump pump 102 running, etc. at the level or mark 136.

The sensor 134 may include magnetic or mechanical floats, pressure sensors, optical, ultrasonic, radar, capacitance, electroconductive or electrostatic sensors. The sensor 134 may be a continuous or a point level switch. A continuous liquid level switch or sensor provides a continuous feedback showing liquid level within a specified range. A point level switch detects whether a liquid level is above or below a certain sensing point. In some embodiments, the sensor 134 may be a reed switch, or a mercury switch, a conductive level sensor, or any type of a suitable switch that changes a state from inactive to active as liquid level reaches a certain level relative to the switch position.

Each of the sensors 124, 126, 128, 130, 132, and 134 may include one or more associated circuits, as well as packaging elements. The sensors 124, 126, 128, 130, 132, and 134 may be electrically or communicatively connected with each other (e.g., via one or more busses or links, power lines, etc.), and may cooperate to enable "smart" functionality described within this disclosure.

The sump pump system 100 may include a mechanical shaker 101 that is physically attached to the sump pump 102 and/or the discharge pipe 112. When engaged, the shaker 101 vibrates at a given frequency for the purpose of transferring motion to the sump pump 102 or the discharge pipe 112 in order to cause the pump 102 or the discharge pipe 112 to vibrate in a manner sufficient to "break loose" a blockage that is blocking the impeller 117 or the pipe 112. The mechanical shaker 101 may be in the form of an electromechanical vibration device (e.g. a linear motor) that physically agitates or shakes the sump pump. The intensity and duration of the vibration produced by the mechanical shaker 101 may be set or adjusted as desired. For example, the mechanical shaker 101 may be set to vibrate intensely and continuously for a short burst of time. As another example, the mechanical shaker 101 may be set to vibrate in multiple operating cycles (e.g., 3 or 5 cycles), with each cycle producing a different level of vibration intensity (e.g., an increase in the level of intensity going from the first cycle to the last cycle). Further, different types of vibration profiles may be specified such as a sine sweep, random vibration, synthesized shock, etc. The mechanical shaker 101 may be a standalone unit that may be retrofitted or added to the sump pump 102. In some embodiments, the mechanical shaker 101 may be integrated with or be part of the sump pump 102. Further, both the mechanical shaker 101 and the water level sensor(s) in the system 100 may be connected to the controller 138 so that the controller 138 can control the operation of the mechanical shaker 101 and the water level sensor(s).

The mechanical shaker 101 may be automatically activated in response to detected soft mechanical failures, such as when water overflow is detected by water level sensor or when the motor 103 runs too long in the absence of any water overflow detection. The mechanical shaker 101 may also be automatically activated in response to the controller 138 detecting potential problems with the motor 103. For example, the controller 138 may detect a vibration or acceleration pattern (e.g., of the water or of the sump pump or sump pipe) indicative of a problem (e.g., a blockage), and may respond by activating the shaker 101.

In some examples, the sump pump controller 138 maintains, tests, etc. the sump pump system 100 by periodically (e.g., every 14 days) running the motor 103 for at least a short duration (e.g., 30 seconds), regardless of the amount of water in the sump basin 104.

To reduce, avoid, prevent, etc. corrosion of the impeller 117 due to extended exposure of the impeller 117 to standing, potentially dirty water, in some examples, the sump pump controller 138 periodically activates the motor 103 (e.g., every 14 days) until the level of water in the sump basin 104 as detected by, for example, the sensor 134 is below the bottom 137 of the impeller 117. When the sensor 134 is a level sensor, the level of water in the sump basin 104 may be detected as being below the impeller 117 when the sensor 134 fails to sense any water. When the sensor 134 is a force sensor, the level of water in the sump basin 104 may be detected as above the bottom 137 of the impeller 117 when the sensor 134 senses a falling water level, water movement (e.g., sloshing, splashing, ripples, etc.) due to pump vibrations, etc.

Additionally and/or alternatively, following a water event, the sump pump controller 138 runs the motor 103 until a current level of the water in the sump basin 104 as detected by, for example, the sensor 134 is below the bottom 137 of the impeller 117 and/or another sump pump component. Example water events include, but are not limited to, a storm, a flood, a plumbing failure, etc. that initially causes an initial inrush of incoming water, followed by a slower flow of incoming water. An example method of detecting a water event includes: (i) during a first time period, detecting that a rate at which water is rising in the sump basin exceeds a first threshold; (ii) during a second, later time period, detecting that a rate at which water is rising in the sump basin 104 is less than a second, lower threshold; and (iii) optionally detecting that water has stopped rising in the sump basin. In some examples, the force sensor 126 is configured to determine the water rise rate in the sump basin 104. The rate at which water is rising in the sump basin 104 may, additionally and/or alternatively, be determined by counting the number of activations of the motor 103 in a period of time to, for example, maintain a current level of water in the sump basin 104 below the water level or mark 142.

As shown in the illustrated example of FIG. 1, the sump pump controller 138 and/or, more generally, the sump pump system 100, may be a smart device that is part of the sump pump network system 160. However, the sump pump controller 138 and/or, more generally, the sump pump system 100 may, additionally and/or alternatively, operate as a standalone system.

The sump pump controller 138 may convey data, updates, alerts, etc. related to the sump pump system 100 to a smart home hub 152 at the property 150 via any number and/or type(s) of local network(s) 154. The smart home hub 152 may connect to smart home devices (e.g., the sump pump controller 138, the sump pump system 100, doorbells, lights, locks, security cameras, thermostats, etc.) to enable a user 156 (e.g., a homeowner) to install, configure, control, monitor, etc. such devices via an electronic device 158, such as a smartphone, a tablet, a personal computer, or any other computing device. In some embodiments, the smart home hub 152 may send alerts, updates, notifications, etc. when certain conditions occur (e.g., when the sump pump controller 138 detects potential failure conditions) to the user 156 via their electronic device 158. Additionally and/or alternatively, alerts, status updates, notifications, etc. may be provided remotely via any number and/or type(s) of remote network(s) 162, such as the Internet. Thus, the user 156 may receive alerts, status updates, notifications, etc. via their electronic device 158 both when they are at the property 150 and when they are away. Moreover, alerts, status updates, notifications, etc. may be sent to a remote processing server 164 (e.g., a server or servers associated with insurance provider or providers) via the remote network(s) 162 for remote monitoring, control, etc.

While examples disclosed herein are described with reference to the sump pump controller 138 receiving and processing data from the sensors 124, 126, 128, 130, 132 and 134 to maintain and/or detect failures of the sump pump system 100, additionally and/or alternatively, data from the sensors 124, 126, 128, 130, 132 and 134 may be sent to the remote processing server 164 for processing to control, maintain and/or detect failures of the sump pump system 100, etc. In some examples, the remote processing server 164 may be part of security system monitoring server.

In some examples, data from the sensors 124, 126, 128, 130, 132 and 134, and/or alerts, status updates, notifications, trends, etc. determined by the sump pump controller 138 are stored in a cache, datastore, memory, etc. 140 for subsequent recall.

While the example sump pump controller 138 and/or, more generally, the example sump pump system 100 for monitoring sump pumps for failures and/or maintaining sump pumps are illustrated in FIG. 1, one or more of the elements, processes, devices and/or systems illustrated in FIG. 1 may be combined, divided, re-arranged, omitted, eliminated or implemented in any other way. Further, the sump pump controller 138 and/or, more generally, the sump pump system 100 may include one or more elements, processes, devices and/or systems in addition to, or instead of, those illustrated in FIG. 1, and/or may include more than one of any or all of the illustrated elements, processes, devices and/or systems.

Figure 2:
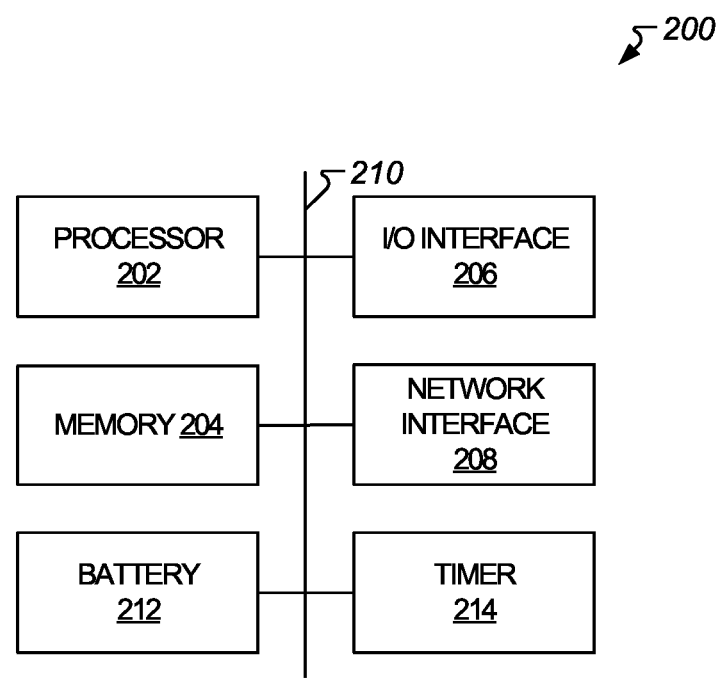
FIG. 2 is a block diagram of an example computing system to implement the various user interfaces, methods, functions, etc., for maintaining and detecting failures of sump pumps, in accordance with disclosed embodiments.

FIG. 2 is a block diagram of an example computing system 200 configured in accordance with described embodiments. The example computing system 200 may be used to, for example, implement all or part of the sump pump controller 138 and/or, more generally, the sump pump system 100. The computing system 200 may be, for example, a computer, an embedded controller, an Internet appliance, and/or any other type of computing device.

The computing system 200 includes, among other things, a processor 202, memory 204, input/output (I/O) interface(s) 206 and network interface(s) 208, all of which are interconnected via an address/data bus 210. The program memory 204 may store software and/or machine-readable instructions that may be executed by the processor 202. It should be appreciated that although FIG. 2 depicts only one processor 202, the computing system 200 may include multiple processors 202. The processor 202 of the illustrated example is hardware, and may be a semiconductor based (e.g., silicon based) device. Example processors 202 include a programmable processor, a programmable controller, a graphics processing unit (GPU), a digital signal processor (DSP), an application specific integrated circuit (ASIC), a programmable logic device (PLD), a field programmable gate array (FPGA), a field programmable logic device (FPLD), etc. In this example, the processor implements sump pump controller 138.

The memory 204 may include volatile and/or non-volatile memory(-ies) or disk(s) storing software and/or machine-readable instructions. For example, the program memory 204 may store software and/or machine-readable instructions that may be executed by the processor 202 to implement the sump pump controller 138 and/or, more generally, the sump pump system 100. In some examples, the memory 204 is used to store the datastore 140.

Example memories 204 include any number or type(s) of volatile or non-volatile tangible, non-transitory, machine-readable storage medium or disks, such as semiconductor memory, magnetically readable memory, optically readable memory, a hard disk drive (HDD), an optical storage drive, a solid-state storage device, a solid-state drive (SSD), a read-only memory (ROM), a random-access memory (RAM), a compact disc (CD), a CD-ROM, a DVD, a Blu-ray disk, a redundant array of independent disks (RAID) system, a cache, a flash memory, or any other storage medium or storage disk in which information may be stored for any duration (e.g., permanently, for an extended time period, for a brief instance, for temporarily buffering, for caching of the information, etc.).

As used herein, the term non-transitory, machine-readable medium is expressly defined to include any type of machine-readable storage device and/or storage disk, to exclude propagating signals, and to exclude transmission media.

The processing platform 200 of FIG. 2 includes one or more communication interfaces such as, for example, one or more of the input/output (I/O) interface(s) 206 and/or the network interface(s) 208. The communication interface(s) enable the processing platform 200 of FIG. 2 to communicate with, for example, another device, system, host system, or any other machine such as the smart home hub 152 and/or the remote processing server 164.

The I/O interface(s) 206 of FIG. 2 enable receipt of user input and communication of output data to, for example, the user 156. The I/O interfaces 206 may include any number and/or type(s) of different types of I/O circuits or components that enable the processor 202 to communicate with peripheral I/O devices (e.g., the example sensors 124, 126, 128, 130, 132, and 134 of FIG. 1) or another system. Example I/O interfaces 206 include a universal serial bus (USB) interface, a Bluetooth® interface, a near field communication (NFC) interface, a serial interface, and/or an infrared transceiver. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (e.g., a mouse, a trackball, a capacitive touch pad, a joystick, etc.), a speaker, a microphone, a printer, a button, etc. Although FIG. 2 depicts the I/O interface(s) 206 as a single block, the I/O interface(s) 206 may include any number and/or type(s) of I/O circuits or components that enable the processor 202 to communicate with peripheral I/O devices and/or other systems.

The network interface(s) 208 enable communication with other systems (e.g., the smart home hub 152 of FIG. 1) via, for example, one or more networks (e.g., the networks 154 and 162). The example network interface(s) 208 include any suitable type of wired and/or wireless network interface(s) configured to operate in accordance with any suitable protocol(s) like, for example, a TCP/IP interface, a Wi-Fi™ transceiver (according to the IEEE 802.11 family of standards), an Ethernet transceiver, a cellular network radio, a satellite network radio, a coaxial cable modem, a digital subscriber line (DSL) modem, a dialup modem, or any other suitable communication protocols or standards. Although FIG. 2 depicts the network interface(s) 208 as a single block, the network interface(s) 208 may include any number and/or type(s) of network interfaces that enable the processor 202 to communicate with other systems and/or networks.

To provide, for example, backup power for the example sump pump controller 138 and/or, more generally, the example sump pump system 100, the example computing system 200 may include any number and/or type(s) of battery(-ies) 212.

To determine the time between events, the example computing system 200 includes any number and/or type(s) of timer(s) 214. For example, a timer 214 may be used to periodically trigger (e.g., every 14 days) the activation of the motor 103 for maintenance purposes. A timer 214 may, additionally and/or alternatively, be used to determine the rate at which water is rising in the sump basin (e.g., number of activations of the motor 103 required) during a period of time.

Figure 3:
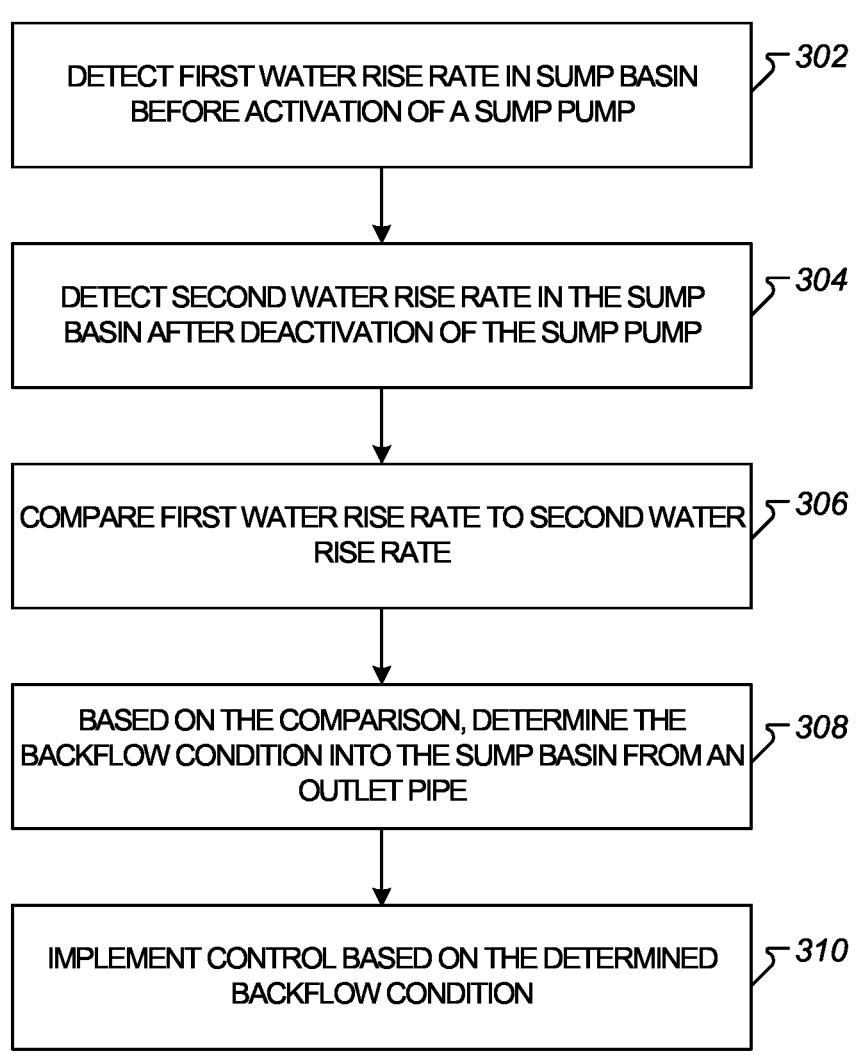
FIG. 3 is a flowchart representative of example methods, hardware logic or machine-readable instructions for implementing the example sump pump controllers of FIGS. 1 and 2, in accordance with disclosed embodiments.

FIG. 3 depicts an example method 300 for detecting backflow from an outlet pipe in a sump pump system and for controlling a sump pump based on the detected backflow. A sump pump system may implement the method 300 to detect backflow (or lack thereof) by detecting and comparing water rise rates in a sump basin before activation or engagement of the sump pump and after deactivation or disengagement of the sump pump. By contrast, most sump pump systems on the market do not detect backflow from an outlet pipe, much less detect backflow in the manner described regarding the method 300.

In ideal circumstances, backflow from the outlet pipe does not exist. A check valve is typically installed on the outlet pipe and, when fully functional, prevents water that has been pumped out of the sump basin via the outlet pipe from flowing back into the sump basin after the sump pump stops pumping. However, the check valve may become temporarily or permanently ineffective for any of a number of reasons, resulting in water back flowing into the sump basin after the sump pump has stopped pumping. A chronic backflow results in the sump basin filling more quickly, which results in the sump pump running more frequently. As a result, a chronic backflow can result in more frequent maintenance of the sump pump, a higher rate of failure of the sump pump over time, and a shorter lifespan of the sump pump. Moreover, in storm conditions, a backflow condition may result in the sump pump becoming overwhelmed as a result of not being able to discharge water from the sump basin at a rate needed to exceed in-flow into the basin (the in-flow being the sum total of the in-flows from the typical inlets to the sump basin and the in-flow from water back flowing into the sump basin via the outlet pipe). Advantageously, the method 300 may be implemented to detect a backflow condition and to act on the detected condition. In short, the method 300 enables improved control of a sump pump in light of a known backflow problem, and enables quicker correction of the problem, thereby avoiding a chronic backflow condition that might otherwise result in more frequent maintenance of the sump pump, a higher rate of failure of the sump pump over time, a shorter lifespan of the sump pump, and higher costs of replacement or repair to the owner of the sump pump.

At a high level, a system implementing the method 300 relies on sensor(s) configured to detect motion (e.g., acceleration), which can be analyzed to calculate the water rise rates. These sensors may be accelerometers, gyroscopes, inertial measurement units (IMUs), or force acceleration sensors. Generally speaking, the sensor(s) may be disposed on or within the water, and may be responsive to the water such that, when the water level rises or drops, the sensor(s) responsively and proportionally drop. One can generally assume that the backflow is zero shortly before water in a sump basin hits a high-water mark that triggers activation of the sump pump (because, presumably, the sump pump has been disengaged for a long enough period of time that, to the extent backflow is allowed via the outlet pipe, all of the water that could have back flowed into the sump basin via the outlet pipe has already done so). Further, if a faulty check valve is allowing backflow, backflow most likely presents itself immediately after the sump pump disengages after pumping. As a result, if backflow is a problem, the water rise rate immediately after disengaging will result from the sum of the backflow rate and the standard in-flow rate from inlet pipes, and the water rise rate immediately before engaging will not include the backflow rate (that is, the water rise rate at that time is likely exclusively attributable to the standard in-flow rate). Consequently, the water rate at a time immediately before engagement can be compared to (e.g., subtracted from) the water rise rate after disengagement to detect backflow. If these two water rise rates are roughly the same, one can conclude little or no backflow is occurring. Alternatively, if a significant difference between the two exists, this suggests the sump pump system suffers from backflow.

In any event, returning to FIG. 3, the method 300 may be implemented, in whole or in part, by any suitable hardware logic, machine-readable instructions, hardware implemented state machines, and/or any combination thereof for implementing a system such as the sump pump controller 138 and/or, more generally, the sump pump system 100 of FIG. 1. The machine-readable instructions may be an executable program or portion of an executable program for execution by a computer processor such as the processor 202 shown in the example processor platform 200 discussed in connection with FIG. 2. If desired, the smart home hub 152 or the remote processing server 164, for example, may implement the method 300, depending on the embodiment.

At a step 302, the sump pump controller 138 detects a first rise rate of water in the sump basin 104, measured using a sensor 126 of FIG. 1, before activation or engagement of the sump pump 102. The sump pump controller 138 may also be referred to herein as the controller 138. The sensor 126 may be a sensor or a transducer able to obtain measurements for determining water rise rate in the sump basin 104. It may be placed at, below, or above the low water level 140 or 136 and, for example, below the high water level 142 in the sump basin 104. Generally speaking, the sensor 126 measures acceleration, which may be observed over time to calculate or detect a rise rate of water in the sump basin 104 (because the sensor 126 generally moves in a manner proportional to changes in water levels in the sump basin 104).

In some embodiments, the sensor 126 may be a force sensor or transducer, such as a load cell or a strain gauge device. In general terms, the load cell or a strain gauge device is a mechanical support with one or more sensors that detect small distortions in the support. Distortions in the mechanical support over time correspond to a measureable rate of acceleration, which yield rise rate in the sump basin 104. The mechanical support may be integrated within or attached to the wall of the sump basin 104, or the sump pump housing 105, or the discharge pipe 112, or any other suitable component of the sump pump system 100. Note, in an embodiment, the sensor 126 detects voltage and changes in voltage in response to motion. This voltage measurement may be transduced to detect positional displacement of the sensor 126, velocity of the sensor 126, and/or acceleration of the sensor 126.

In some embodiments, the sensor 126 may include one or more accelerometers, a gyroscope, or an inertial measurement unit (IMU). Generally, a rising or a falling water level displaces the sensor 126, and the sensor 126 translates the displacement into inertial acceleration measurement. The controller 138 uses the acceleration measurements at the sensor 126 to determine water rise rate in the sump basin 104. In some embodiments, the sensor 126 may be a pressure sensor placed at the bottom of the sump basin 104, measuring the change in pressure of the body of water in the sump basin 104 on the sensor 126. The controller 138 can use the changes in the pressure measurements to determine the rise rate in the sump basin 104.

At a step 304, the controller 138 detects a second rise rate of water in the sump basin 104, measured using the sensor 126, after deactivation of the sump pump 102. In an embodiment, the second rise rate is measured immediately after deactivation of the sump pump 102 (e.g., 1, 2, 5, or 10 seconds after deactivation of the sump pump 102). The second rise rate may also be measured multiple times over a certain time period (e.g., every 2 seconds over a second period, or every 10 seconds over a 60 second period, etc.), and the controller 138 may calculate an average value of the repeated measurements. In some implementations, multiple periodic measurements of the second rise rate may be used to determine the second rise rate as a function of time. In some embodiments, the controller 138 may measure the second rise rate in the sump basin 104 after activation of the sump pump 102, while the pump is in operation. In this scenario, the controller 138 may measure the second rise rate once, for example 5, 10, or 20 seconds after activation of the sump pump 102, or obtain an average value of the rise rate measured over a period of time (e.g., measured every 1 or 2 seconds and averaged over 10 seconds following activation of the sump pump 102). The controller may also take periodic measurements (e.g., every 5, 10, 60, or 120 seconds) over the entire time when the sump pump 102 is in operation, and calculate an average value of these measurements for the value of the second rise rate, or use the periodic measurements to determine the rise rate as a function of time. In some embodiments, the controller 138 may analyze measurements before, during, and after activation of the sump pump 102.

As described earlier with reference to FIG. 1, the pump activation switch 122 activates the pump motor 103 when the water level in the sump basin 104 reaches the high water level 142. The activated motor 103 energizes the sump pump 102, and the sump pump 102 begins pumping water out of the sump basin 104 via the discharge pipe 112. In general, under normal conditions, in a properly working sump pump system 100, this action should begin lowering the water level to below the high water level 142, resulting in a negative water rise rate. The pumping action of the operating sump pump 102 may also keep the water level constant, resulting in the water lever rise rate equal to zero, or slow down the rise of the water level in the sump basin 104, resulting in a positive water rise rate less than the first water rise rate.

When the water level falls to the low level 140 or 136, the pump activation switch 122 disengages, which deactivates the pump motor 103 and sump pump 102. In a properly working sump pump system 100, water rise rate after deactivation of the sump pump 102 should be either zero (if there is no water inflow into the sump pump basin 104), or should equal the inflow rate from inlet pipes, for example, the inlet pipe 108. A water rise rate value taken after deactivation of the sump pump 102 higher than the first water rise rate (the initial inflow rate) may indicate conditions of backflow into the sump pump basin 104 due to, for example, soft mechanical failures of the sump pump system 100, or other conditions affecting the performance of the sump pump system 100.

In some embodiments, the controller 138 may analyze motor control characteristics such as current draw and pump motor 103 rotation speed. Based on the analysis, the controller 138 may determine whether the pump 102 is pumping water or air. The controller 138 can utilize the dry/submerged status of the pump 102 to calculate a fill rate and/or a level of water (e.g., without directly sensing a water level via a level sensor).

For example, the controller 138 may calculate (or be configured to store) a high-water volume (i.e., the volume of water in the basin when the water reaches the high-water mark). Similarly, the controller 138 may calculate (or be configured to store) a dry-pump volume (i.e., the volume of water in the basin when the water drops low enough to result in the pump 102 pumping air rather than water). The difference between the high-water volume and the dry-pump volume may be referred to as the delta volume (the controller 138 may be configured to store the delta volume, or it may be configured to calculate the delta volume). For example, the delta volume may be 2.5 gallons. The controller 138 may detect when the high-water volume exists (because the time at which the pump 102 is activated is likely the same time at which the high-water volume is achieved). Further, using the described techniques, the controller 138 may detect a moment at which an active pump or impeller starts pumping air instead of water. The controller 138 may calculate the time (e.g., 30 seconds or ½ minute) between these two moments and may divide the known delta volume (e.g., 2.5 gallons) by the calculated time (½ minute) to arrive at a fill rate (e.g., 5 gallons per minute).

Further, the controller 138 may utilize the calculated fill rate to estimate the level in the basin. For example, the controller 138 may start a timer when the water level reaches a known sensed level. For example, the low-water mark may be a known height. After a level sensor detects the low-water mark (e.g., the mark at which the pump 102 typically stops pumping), it may start the timer to track a time and may multiply the time by the fill rate to estimate the level at the time. This may be done multiple times if desired (e.g., continuously). Likewise, the controller 138 may be configured to store a known height just below the pump or impeller (i.e., the "dry-pump mark"). The controller 138 may utilize the disclosed techniques to detect (e.g. via motor control characteristics or power/current draw) a moment at which the pump starts to dry pump. The controller 138 may then assume the water level is at the dry-pump mark, and may utilize a timer and the fill rate to calculate or track an estimated water level (e.g., continuously if desired). The estimated water level may be used as a secondary or back-up level tracking (e.g., in case the primary level sensor faults). In other words, if an estimated water level indicates the water is above the high-water mark and a primary level sensor has not detected water at the high-water mark, the controller 138 may nevertheless activate the pump 102 to prevent flooding. If desired, the controller 138 may generate an alarm to notify someone (e.g., a user 156 or a home insuring party) that the level sensor may be faulty. Using motor characteristics change over time to determine water rise rate in the sump basin 104 can be used in addition to or instead of determining water rise rate via the methods described in the steps 302 and 304.

At a step 306, the controller 138 compares the first water rise rate to the second water rise rate. The controller 138 may determine a difference between the two values of water rise rate by subtracting the second rise rate from the first rise rate or by subtracting the first rise rate from the second rise rate. Further, the controller 138 may compare the obtained difference to a predetermined threshold, or a scale. The threshold or a scale may depend on a variety of variables, such as the pump 102 discharge rate (e.g., 3200 gallons per hour), capacity of the sump basin 104 (e.g., 26 gallons), and/or the volume of water contained in the discharge pipe 112 between the entrance to the discharge pipe 112 and the check valve 114. The threshold or a scale may be static or dynamic (for example, it may depend on the value of the detected first water rise rate.) Alternatively, the controller 138 may employ a custom analysis to determine a value for comparison, based on the two independent variables of the first and the second water rise rate in the sump basin 104.

At a step 308, the controller 138 determines, based on a comparison of the first rise rate to the second rise rate at step 306, a backflow condition indicating whether or not water is backflowing into the sump basin 104 from the discharge pipe 112. The controller 138 may detect, based on the comparison of the rates at step 306 that there is no backflow condition in the sump pump system 100, indicating that the check valve 114 is working as expected. Alternatively, the controller 138 may detect that water is backflowing, and based on an analysis, determine that the rate of backflow is indicative of a condition (or a degree of damage) of the check valve 114. In some embodiments, when the controller 138 determines backflow condition using water rise rate measurements after the sump pump 102 deactivation and/or during the sump pump 102 operation, the controller may determine that the sump pump 102 is overwhelmed (e.g., inflow rise rate is higher than pump 102 discharge rate), or may determine a condition of blockage in the discharge pipe 112, or a condition of water flowing back via the discharge pipe 112 (for example, indicating a cracked pipe or improper installation).

In some embodiments, the controller 138 may detect a backflow condition indicating whether or not water is backflowing into the sump basin 104 from the discharge pipe 112 by monitoring the position of the impeller 117 or the position of a rotor (not shown) of the pump motor 103. The controller 138 may convert the detected change in position over time into rotation speed in turns per minute (revolutions per hour). Water flowing back down the outlet pipe 112 may exert sufficient pressure on the impeller 117 to spin the impeller in the opposite direction to the normal flow. The controller 138 may sense the position of the impeller 117 or pump motor 103 rotor, for example, by sensing feedback for brushless DC motor control, or by sensing generation of electricity from the pump motor 103 running in reverse. For example, in the system 100 where the pump 102 is not activated and the impeller 117 or the rotor of the pump motor 103 is turning in the opposite direction to the normal flow, and there is no water detected at the inlet sensor, the controller 138 may determine that water is backflowing via the outlet pipe 112 without calculating the water rise rate. In another example, backflow may be detected in the system 100 from a decreased frequency of rotation of the pump motor 103. For example, in a system 100 with a known rotation speed of the pump motor 103 (e.g., 1725 rpm), a detected decrease of the rotation speed may signal water backflowing via the outlet pipe 112, which would be exerting pressure onto the impeller 117 opposite the direction of normal rotation.

At a step 310, the controller 138 implements control based on the detected backflow condition determined at the step 308. The control may include the controller 138 activating the deactivated sump pump 102 in response to detecting water backflowing into the sump basin 104, the additional activation taking place independently of the activation by the sump pump activation switch 122. Additionally or alternatively, the control may include the controller 138 adjusting (temporarily or permanently, depending on the determined backflow condition) the high water mark to a lower level in the sump basin 104, resulting in an earlier activation of the sump pump 102. The control may include the controller 138 activating a backup pump (not shown). The controller 138 may determine the run time of the backup pump based on the determined backflow condition. The controller 138 may communicate with the smart home hub 206 to evoke other backup systems (not shown). Additionally or alternatively, the controller 138 may activate an alarm to indicate to a user 156 (e.g., a homeowner) that water is backflowing. The alarm may be configured to be audible at the sump pump basin 104, or at the property level where the sump pump system is installed, or on the territory of the property 150. The alarm may be a graphical user interface notification made available at an electronic device coupled to the sump pump control system, such as the electronic device 158 (e.g., a smart phone associated with the user 156, or an electronic device associated with insurance provider(s), or an electronic device of an external service that monitors condition of the property 150, etc.). In some embodiments, the alarm may be a notification at the remote processing server 164 (e.g., associated with an insurance provider). In some embodiments, the alarm may be a trigger to order replacement sump pump system components and their necessary fixtures. The trigger may be, for example, a push notification to the user device linked to the user's (e.g., the user 156) account with an online retailer of the user's choice. The notification may be an alert requiring the user's approval to complete the order.

In some embodiments, the controller 138, based on the rise rate measurement, may adjust the pumping rate of the sump pump 102, where the sump pump motor 103 may be a variable speed motor. A known parameter of the dimensions of the sump basin 104 (e.g., diameter or width and length) and the detected water level rise rate would yield a volume of water rise level per unit of time (e.g., gallons per second, or gallons per minute). The controller 138 may adjust the pumping rate of the sump pump 102 to the match or overcome the water rise rate for a specific size of the sump basin 104. The controller 138 may implement this control in addition to or instead of generating an alert to, for example, the user 156.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the method 300 specifically, the described functions may be implemented, in whole or in part, by the devices, circuits, or routines of the system 100 shown in FIG. 1. The method 300 may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

What is claimed is:

1. A system for detecting and utilizing rise rates when implementing control of a sump pump, the system comprising: a sump pump configured to pump water out of a sump basin; a sensor coupled to the sump basin; a sump pump control system coupled to the sump pump and the sensor, wherein the sump pump control system is configured to: detect, via the sensor, a first rise rate of water in the sump basin during a first time period before an activation of the sump pump; detect, via the sensor, a second rise rate of the water in the sump basin during a second time period after a deactivation of the sump pump; detect, based on a comparison of the first rise rate to the second rise rate, a backflow condition indicating whether or not water is backflowing into the sump basin; and implement control based on the detected backflow condition, wherein the control includes at least generating a signal indicating the backflow condition in the sump basin.

2. The system of claim 1, wherein the detected backflow condition is a condition in which water is backflowing into the sump basin.

3. The system of claim 2, wherein the sump pump control system is configured to implement control based on the detected backflow condition in a manner that includes activating the sump pump in response to detecting the water is backflowing into the sump basin.

4. The system of claim 2, wherein the sump pump control system is configured to implement control based on the detected backflow condition in a manner that includes adjusting a high water mark for activating the sump pump from a first value corresponding to a first water level to a second value lower than the first value.

5. The system of claim 2, wherein the sump pump control system is configured to implement control based on the detected backflow condition in a manner that includes activating an alarm for the sump pump to indicate to a user that water is backflowing into the sump basin.

6. The system of claim 2, wherein the sump pump control system is configured to implement control based on the detected backflow condition in a manner that includes activating a backup sump pump.

7. The system of claim 5, wherein the alarm is a graphical user interface notification made available at an electronic device coupled to the sump pump control system.

8. The system of claim 1, wherein the sensor is configured to detect acceleration.

9. The system of claim 1, wherein the sensor is a force acceleration sensor configured to detect acceleration based on a level of force exerted on the sensor.

10. The system of claim 1, wherein the sump pump is disposed in the sump basin and configured to pump water out of the sump basin via an outlet pipe.

11. The system of claim 1, wherein the sump pump control system is configured to detect, based on the comparison of the first rise rate to the second rise rate, the backflow condition in a manner that includes:
   performing the comparison by calculating a rate of backflow by subtracting one of the first and second rise rates from the other of the first and second rise rates;
   detecting that the rate of backflow exceeds a threshold; and
   detecting, in response to detecting that the rate of backflow exceeds a threshold, that the backflow condition is a condition in which water is backflowing into the sump basin.

12. A method for detecting and utilizing rise rates when implementing control of a sump pump, the method comprising: detecting, via a sensor coupled to a sump basin, a first rise rate of water in the sump basin during a first time period before an activation of a sump pump; detecting, via the sensor, a second rise rate of the water in the sump basin during a second time period after a deactivation of the sump pump; 3 detecting, based on a comparison of the first rise rate to the second rise rate, a backflow condition indicating whether or not water is backflowing into the sump basin; and implementing control, via the sump pump control system, based on the detected backflow condition, wherein the control includes at least generating a signal indicating the backflow condition in the sump basin.

13. The method of claim 12, wherein the detected backflow condition is a condition in which water is backflowing into the sump basin.

14. The method of claim 13, wherein implementing control based on the detected backflow condition comprises activating the sump pump in response to detecting the water is backflowing into the sump basin.

15. The method of claim 13, wherein implementing control based on the detected backflow condition comprises adjusting a threshold for activating the sump pump from a first value corresponding to a first water level to a second value lower than the first value.

16. The method of claim 13, wherein implementing control based on the detected backflow condition in a manner that includes activating an alarm for the sump pump to indicate to a user that water is backflowing into the sump basin.

17. The system of claim 16, wherein the alarm is a graphical user interface notification made available at an electronic device coupled to the sump pump control system.

18. The method of claim 12, wherein the sensor is an accelerometer, a gyroscope, or an inertial measurement unit (IMU).

19. The method of claim 12, wherein the sensor is a force acceleration sensor configured to detect acceleration based on a level of force exerted on the sensor.

20. The method of claim 12, wherein detecting, based on the comparison of the first rise rate to the second rise rate, the backflow condition comprises:
   performing the comparison by calculating a rate of backflow by subtracting one of the first and second rise rates from the other of the first and second rise rates;
   detecting that the rate of backflow exceeds a threshold; and
   detecting, in response to detecting that the rate of backflow exceeds a threshold, that the backflow condition is a condition in which water is backflowing into the sump basin.

* * * * *